April 17, 1928.

F. H. SCHULTZ

BOTTLE OPENER

Filed Feb. 4, 1927

1,666,249

Inventor
F. H. Schultz
By Arthur H. Sturges,
Attorney

Patented Apr. 17, 1928.

1,666,249

UNITED STATES PATENT OFFICE.

FERDINAND H. SCHULTZ, OF COUNCIL BLUFFS, IOWA.

BOTTLE OPENER.

Application filed February 4, 1927. Serial No. 165,835.

This invention relates to a milk bottle opener and has for its principal object to provide an opener which will be convenient in use for removing the caps generally used for closing the bottles containing milk, cream or other contents, said device to be of such simple construction that it may be manufactured at a nominal cost.

An object of the invention is to provide an opener which, in operation, will cut a slit in the cap before its removal to relieve the partial vacuum formed between the surface of the milk and the underneath side of the cap by admitting air through said slit.

Another object is to provide an opener of such construction that the cap may be removed without pressing it downwardly, in an appreciable degree upon the surface of the milk or upon the air-chamber beneath the cap.

A still further object of the invention is to provide a device adapted to remove a milk bottle cap by means of applying a rolling motion to the cap which is similar to the rolling off or pealing off of the tin from a sardine can or container.

Other objects of the invention will be mentioned hereinafter.

In the accompanying drawing which illustrates the invention,

Figure 1:
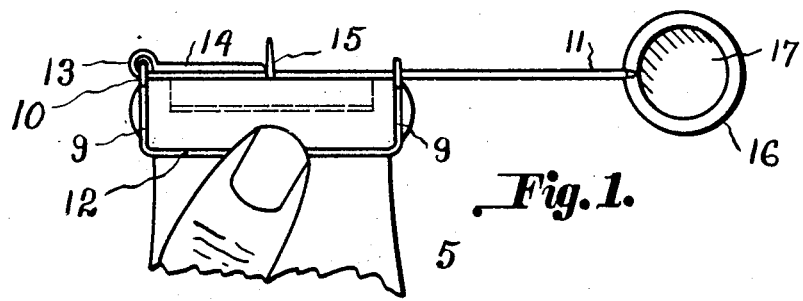
Figure 1 shows a part of a milk-bottle in side elevation with the opener applied thereto, the hook being in elevated position

Referring now to the drawing for a more particular description, the invention is shown and described in connection with a milk bottle 5 having a rim or ridge 6 outwardly of its open top, an annular recess 7 being formed opening on the inner side and normally open at the top of the bottle.

The cap for closing the milk bottle is indicated at 8.

This cap is generally constructed of flexible material such as card-board and since it is of circular form it operates as an effective closure for the reason that it fits accurately when pressed down into the recess.

However, removal of the cap from the recess is often attended with difficulty occasioned by ejection and loss of a part of the milk or cream, for the reason that the edges of the cap closely engage the walls of the recess and the cap is not accessible because it is disposed at the bottom of the recess.

Also an air-chamber is often formed beneath the cap if the bottle has not been completely filled, and it is well known that, if a blunt instrument is used for removal of the cap the air will be compressed to cause ejection of the contents.

By use of the present invention the cap may be readiy removed and the removal of the cap will not be attended by any objectionable features.

The invention consists of a frame adapted to be manually supported upon or against the neck of the bottle and a rotatable shaft mounted in the frame and provided with a hook of such form that it will cut a slot in the cap and will elevate the cap from the recess.

For the above purposes the frame may have any suitable construction, but I have shown and prefer the use of a wire strand of approximately U-shape, its arms 9 being provided with terminal loops 10 to provide bearings for a rotatable shaft 11, that part 12 of the strand between the arms being of curved form to correspond approximately to the curvature of the neck of the bottle or curvature of that part of the neck beneath its rim 6.

As thus described the curved part 12 of the U-shaped frame may be manually pressed as illustrated in Figure 1 of the drawing, against the neck of the bottle, the arms 9 projecting upwardly and disposing the loops 10 at the top of the neck for receiving the shaft 11.

The shaft at one of its end portions is bent to form a holder-loop 13 and an extension 14, said extension being bent around the body of the shaft to provide a hook 15 of eccentric form.

The extension 14 has a length approximately equal to one-half the diameter of the recess 7.

The proportions for the hook are such that when the shaft is rotated in one direction said hook will engage the cap 8. Also the hook has a form convergent toward its end and since it is of eccentric form its sharp terminal will cut a slot in the cap 7.

In operation, on account of the form of the hook, the latter will be drawn along upon the cap, its sharp terminal incising and forming the slot 15' in the cap, a further rotation causing the end of the hook to engage the lower side of the cap, and a still further rotation of the shaft causing the cap to be elevated from the recess 7.

Therefore, on account of the shape of the hook, the cap will not be pressed downwardly into the bottle in an appreciable degree, but will be lifted from the recess, and on account of this operation, no ejection or waste of milk or cream will occur.

If an air-chamber has been formed beneath the cap, the air from the chamber may move outwardly of the slit produced by the movement of the hook.

Furthermore, if a partial vacuum is formed between the cap and contents of the bottle, air admitted through said slot 15' will relieve said vacuum, and thus the liquid contents of said bottle will not spill.

Figure 2:
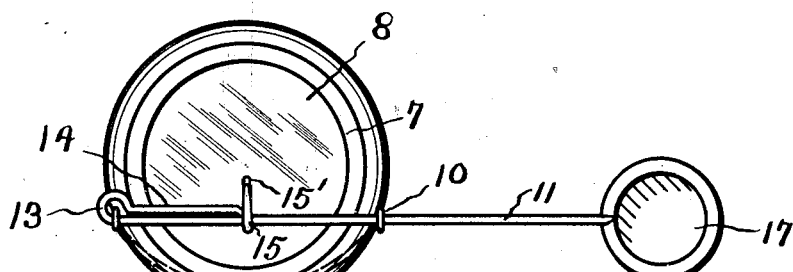
Figure 2 is a plan view of parts, the shaft being rotated 45 degrees to dispose the hook in engagement with the cap.
Figure 3:
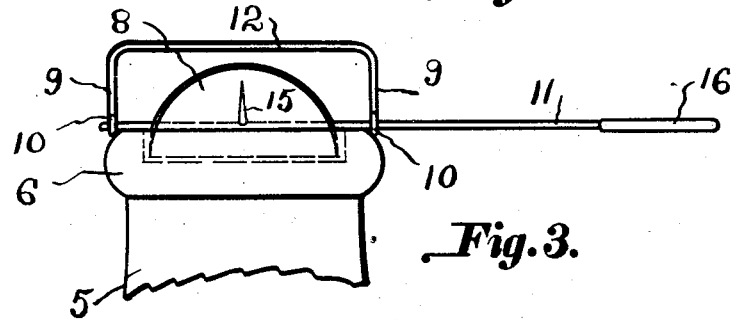
Figure 3 shows a part of the bottle in side elevation and illustrates the position of parts when the cap has been removed, the shaft having been rotated approximately 270 degrees from the position shown in Figure 1.

During operation, the parts being disposed as shown in Figure 1 of the drawing, a rotation of the shaft approximately 90 degrees will cause the sharp end of the hook to engage the upper surface of the cap, the parts then being disposed as shown in Figure 2. A further rotation of the shaft of 90 degrees will cause the hook to swing, and in its movements it will form the slit 15' in the cap, its end moving into engagement with the lower surface of the cap, adjacent to the slit, and a further rotation of 90 degrees will dispose the parts as shown in Figure 3 of the drawing, the cap being removed from the recess.

The shaft may be provided with any suitable handle for use in causing its rotation, the preferred handle being a circular terminal 16 reinforced by a web 17, this web being adapted to be secured to the circular part 16, by any suitable means. This web operates to reinforce the circular terminal of the shaft and, if desired, may be used for advertising purposes.

Figure 4:
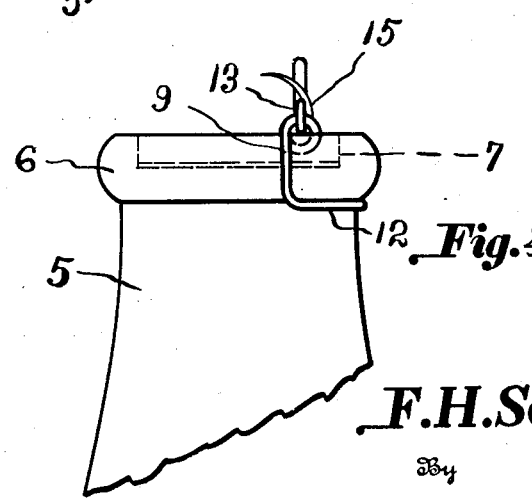
Figure 4 shows the position of parts taken at right angles to the position shown in Figure 1, and illustrating the eccentric form of the hook.

By particular reference to Figure 4 it will be seen that the hook 15 is eccentrically mounted. Its sharp point will incise the cardboard cap, since during the downward movement of said hook the point of the hook, which is first presented to the cap is at substantially a right-angle to the cap and for this reason when pressure is applied to the key 16 the hook will pierce the cardboard cap 8 easily. However, after piercing through said cap a further rotation of the key causes the point of the hook to come in contact with the underneath side of the cap and it will be noted that at this time the point of the hook will be in substantial alignment with the cap and therefore, will not pierce through the cap in the manner shown by the prior art. Now since the hook will not pierce through the cap a further rotation of the key 16 will start to roll the cap upward slightly at its corners or edge and in this manner the cap may be easily removed without the usual suction which causes the contents of the bottle to be forcibly expelled or splashed out to soil the operator's clothes, and other adjacent objects.

The offset and curved part 12 of the frame, as shown to advantage in Figure 4, is adapted to fit under and register and cooperate with the enlarged annular bead or neck portion 6 of the bottle 5 to admit said rolling motion of the cap.

It will be seen that the extension 14 and the loop 13 for the shaft operate to control the swinging movements of the frame. It will be noted that a rotation of the shaft from its position shown in Figure 1 of more than 180 degrees will cause an upward swinging movement of the body 12 of the U-shaped frame, this feature being of an advantage for removal of the cap from the recess.

While the device has been described as a means for removing the caps from milk-bottles, it is shown that the contents of the bottle is not important, and the device may be used upon any container having a flexible disc for closing its open upper end.

I claim as my invention:—

A cap remover for use with disc caps seated in depressed ledges of the mouths of milk bottles and wherein the bottles have annular beads at the upper ends of their necks, comprising an anchoring frame curved to the configuration of one side of the neck and adapted to fit thereagainst beneath said bead, said frame comprising a length of wire having its opposite ends extending upwardly at substantially right angles to the intermediate part of the frame and rolled over to provide pivot eyes, a shaft member of wire extending through said eyes of the frame and having one end returned upon itself about the adjacent eye and extending along the shaft member to a point thereof intermediate said eyes, the returned extremity of said shaft having a curved tapering hook projecting spirally from one side of the shaft member and adapted to engage in an adjacent underlying portion of the disc cap whereby upon rotation of the shaft member said spirally positioned hook is adapted to engage in the cap and elevate the same from the depressed ledge in the bottle neck.

FERDINAND H. SCHULTZ.